(12) United States Patent
Kitajima et al.

(10) Patent No.: US 7,448,459 B2
(45) Date of Patent: Nov. 11, 2008

(54) METHOD FOR DETECTING ABNORMALITY IN A HYBRID VEHICLE

(75) Inventors: Shinichi Kitajima, Wako (JP); Katsuhiro Kumagai, Wako (JP); Futoshi Nishioka, Wako (JP); Atsushi Izumiura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/315,178

(22) Filed: Dec. 10, 2002

(65) Prior Publication Data

US 2003/0106728 A1     Jun. 12, 2003

(30) Foreign Application Priority Data

Dec. 12, 2001   (JP)   ............................ 2001-378582

(51) Int. Cl.
*B60K 6/22*     (2007.10)
(52) U.S. Cl. .................... 180/65.4; 180/65.2; 180/65.3; 701/22
(58) Field of Classification Search ................ 123/571, 123/568, 198 D, 198 F; 180/65.2, 65.3, 65.4, 180/65.8; 702/22, 51, 55; 701/22, 51, 55; *B60K 6/04*
See application file for complete search history.

(56) References Cited

U.S. PATENT DOCUMENTS

| | | | | |
|---|---|---|---|---|
| 4,715,348 A | * | 12/1987 | Kobayashi et al. ............ 73/116 |
| 4,825,841 A | * | 5/1989 | Norota et al. ................ 123/676 |
| 5,103,655 A | * | 4/1992 | Kano et al. ................. 73/118.1 |
| 5,150,695 A | * | 9/1992 | Kondo .................... 123/568.16 |
| 5,152,273 A | * | 10/1992 | Ohuchi .................... 123/568.16 |
| 5,257,610 A | * | 11/1993 | Ohuchi .................... 123/568.16 |

(Continued)

FOREIGN PATENT DOCUMENTS

EP    1 148 228 A2    10/2001

(Continued)

OTHER PUBLICATIONS

Patent Abstracts of Japan vol. 2000, No. 22, Mar. 9, 2001 & JP 2001 140665 A (UNISIA JECS Corp), May 22, 2001 *abstract*.

(Continued)

*Primary Examiner*—Paul N. Dickson
*Assistant Examiner*—Vaughn T Coolman
(74) *Attorney, Agent, or Firm*—Kratz, Quintos & Hanson, LLP

(57) ABSTRACT

A method for detecting an abnormality in a hybrid vehicle. The hybrid vehicle includes an engine that can run in a cylinder cut-off state where intake and exhaust valve lifts are made zero, and a motor/generator that functions as both a motor and a generator. The vehicle travels by means of the power of at least one of the engine and the motor/generator and carries out regenerative braking by the motor/generator while running the engine in a cylinder cut-off state during deceleration. When detecting an abnormality in a negative intake pressure sensor or an EGR control valve based on the negative intake pressure of the engine, the engine is prohibited from running in a cylinder cut-off state even during deceleration, thus generating a negative intake pressure and thereby enabling the abnormality detection to be carried out without any problems.

4 Claims, 8 Drawing Sheets

U.S. PATENT DOCUMENTS

| | | | |
|---|---|---|---|
| 5,309,887 A | | 5/1994 | Kondo et al. ................. 123/571 |
| 5,513,616 A | * | 5/1996 | Matsumoto et al. .... 123/568.16 |
| 5,562,085 A | * | 10/1996 | Kosuda et al. ......... 123/568.24 |
| 5,621,167 A | * | 4/1997 | Fang-Cheng ............... 73/118.1 |
| 5,632,257 A | * | 5/1997 | Machida et al. ............. 123/435 |
| 5,675,080 A | * | 10/1997 | Wada ........................ 73/118.1 |
| 5,680,849 A | * | 10/1997 | Morikawa et al. ........... 123/520 |
| 5,943,999 A | * | 8/1999 | Yoshihara et al. ...... 123/568.16 |
| 5,992,390 A | * | 11/1999 | Moyer ........................ 123/481 |
| 6,013,992 A | * | 1/2000 | Ishikawa et al. ............ 318/376 |
| 6,024,075 A | * | 2/2000 | Bidner et al. .......... 123/568.16 |
| 6,047,692 A | * | 4/2000 | Toyoda ........................ 123/698 |
| 6,098,733 A | * | 8/2000 | Ibaraki et al. ............. 180/65.2 |
| 6,186,253 B1 | * | 2/2001 | Barnhart et al. ........... 180/65.2 |
| 6,244,258 B1 | * | 6/2001 | Akiyama et al. ....... 123/568.21 |
| 6,257,194 B1 | * | 7/2001 | Kerns et al. ............. 123/198 D |
| 6,257,214 B1 | * | 7/2001 | Bidner et al. .......... 123/568.16 |
| 6,262,491 B1 | * | 7/2001 | Kitajima et al. ........... 290/40 C |
| 6,305,757 B1 | * | 10/2001 | Ohsaki et al. ............. 303/114.3 |
| 6,334,079 B1 | * | 12/2001 | Matsubara et al. ............ 701/22 |
| 6,371,089 B1 | * | 4/2002 | Matsuoka et al. ........... 123/519 |
| 6,376,927 B1 | * | 4/2002 | Tamai et al. .............. 290/40 C |
| 6,390,077 B1 | * | 5/2002 | Simpson et al. ........ 123/568.16 |
| 6,401,684 B2 | * | 6/2002 | Hori et al. ................ 123/198 F |
| 6,575,146 B1 | * | 6/2003 | Kanai et al. ................. 123/520 |
| 6,616,570 B2 | * | 9/2003 | Wakashiro et al. ............. 477/5 |
| 6,629,024 B2 | * | 9/2003 | Tabata et al. .................. 701/22 |
| 6,634,219 B2 | * | 10/2003 | Ito ............................... 73/116 |
| 6,651,436 B2 | * | 11/2003 | Izumiura et al. .............. 60/708 |
| 6,658,345 B2 | * | 12/2003 | Miller ....................... 701/108 |
| 6,687,603 B2 | * | 2/2004 | Wakashiro et al. .......... 701/110 |
| 6,837,226 B2 | * | 1/2005 | Wang et al. ............ 123/568.16 |
| 6,837,227 B2 | * | 1/2005 | Jaliwala et al. ......... 123/568.21 |
| 6,939,263 B2 | * | 9/2005 | Wakashiro et al. ............. 477/3 |

FOREIGN PATENT DOCUMENTS

JP          2001-140665          5/2001

OTHER PUBLICATIONS

Patent Abstracts of Japan vol. 0141, No. 44 (M-0951), Mar. 19, 1990 & JP 2 009937 A (Daihatsu Motor Co Ltd., Jan. 12, 1990 *abstract*.

* cited by examiner

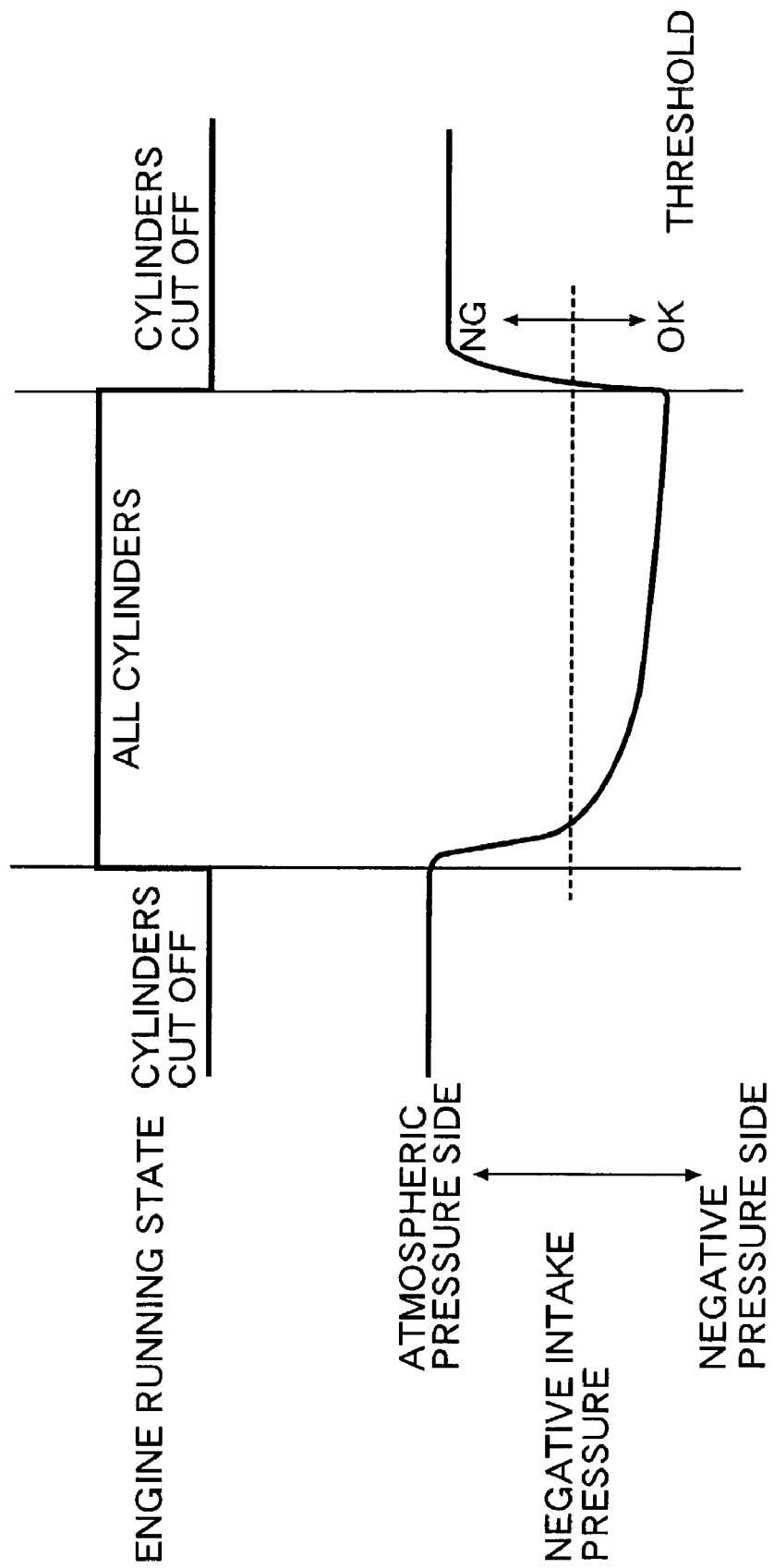

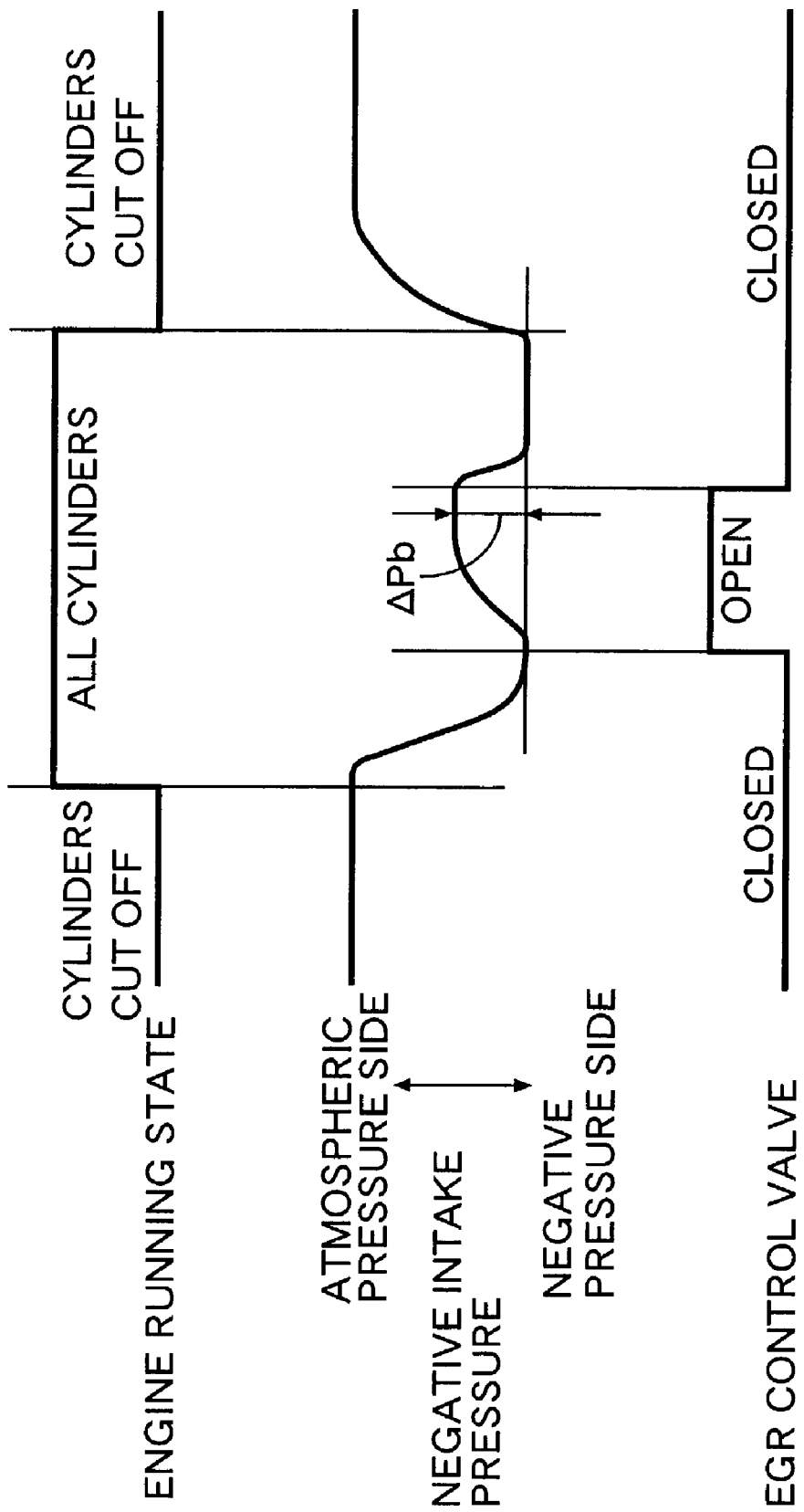

METHOD FOR DETECTING ABNORMALITY IN A HYBRID VEHICLE

BACKGROUND OF THE INVENTION

1. Field of the Invention

The present invention relates to a hybrid vehicle provided with an engine that can run in a cylinder cut-off state where intake and exhaust valve lifts are both made zero, and a motor/generator that functions as both a motor and a generator.

2. Description of the Related Art

In a conventional hybrid vehicle, the motor/generator functions as a generator when the engine is in a fuel cut state during deceleration so as to carry out regenerative braking, thereby recovering the kinetic energy of the vehicle as electrical energy. In Japanese Patent Application Laid-open No. 2001-140665, when a hybrid vehicle is being decelerated the engine is run in a cylinder cut-off state by making the intake and exhaust valve lifts zero, thus minimizing the pumping loss so as to make the engine braking ineffective, and thereby enhancing the energy recovery efficiency of the regenerative braking.

Legislation makes it obligatory to detect and display abnormalities in each part of an engine mounted in a vehicle (OBD; on board diagnosis), and a negative intake pressure sensor and an Exhaust Gas Recirculation ("EGR") control valve are targets for the detection of abnormalities based on the engine negative intake pressure. However, as in the engine described in Japanese Patent Application Laid-open No. 2001-140665 above, if the engine is run in a cylinder cut-off state where the intake and exhaust valve lifts are made zero during deceleration, because the engine does not exhibit a pumping action, no negative intake pressure is generated, and there is the problem that abnormalities in the negative intake pressure sensor and the EGR control valve cannot be detected.

SUMMARY OF THE INVENTION

The present invention has been carried out in view of the above-mentioned circumstances, and it is an object of the present invention to enable an abnormality to be detected based on the engine negative intake pressure without any problems in a hybrid vehicle that, during deceleration, runs the engine in a cylinder cut-off state where the intake and exhaust valve lifts of the engine are made zero.

In order to accomplish the above-mentioned object, in accordance with a first aspect of the present invention, there is proposed a method for detecting an abnormality in a hybrid vehicle provided with an engine that can run in a cylinder cut-off state where intake and exhaust valve lifts are made zero, and a motor/generator that functions as both a motor and a generator, the vehicle traveling by means of the power of at least one of the engine and the motor/generator and carrying out regenerative braking by the motor/generator while running the engine in a cylinder cut-off state during deceleration; wherein, when detecting an abnormality based on a negative intake pressure of the engine, the engine is prohibited from running in a cylinder cut-off state even during deceleration.

In accordance with this arrangement, in the hybrid vehicle carrying out regenerative braking by the motor/generator functioning as a generator in a state in which the engine is run in a cylinder cut-off state during deceleration so as to decrease the pumping loss, when an abnormality detection based on the negative intake pressure of the engine is carried out, the engine is prohibited from running in a cylinder cut-off state even during deceleration, so that the abnormality detection can be carried out without any problems in a state in which the engine is run on all cylinders and a negative intake pressure is generated.

Furthermore, in accordance with a second aspect of the present invention, in addition to the first aspect, there is proposed a method for detecting an abnormality in a hybrid vehicle wherein the abnormality detection is detection of an abnormality in a negative intake pressure sensor or an EGR control valve.

In accordance with this arrangement, because the engine is run on all cylinders during deceleration so as to generate a negative intake pressure, an abnormality can be detected in a negative intake pressure sensor or an EGR control valve without any problems.

The above-mentioned object, other objects, characteristics and advantages of the present invention will become apparent from an explanation of a preferred embodiment that will be described in detail below by reference to the attached drawings.

BRIEF DESCRIPTION OF THE DRAWINGS

FIGS. 1 to 8 show one embodiment of the present invention, where

FIG. 1 is schematic diagram of a power unit of a hybrid vehicle;

FIG. 2 is a plan view showing a part of a cylinder head of an engine;

FIG. 3 is a magnified view of an essential part in FIG. 2;

FIG. 4 is a cross section along line 4-4 in FIG. 2;

FIG. 5 is a cross section along line 5-5 in FIG. 2;

FIG. 6 is a flow chart for explaining the method steps of the present invention;

FIG. 7 is a diagram for explaining a technique for detecting an abnormality in a negative intake pressure sensor; and FIG. 8 is a diagram for explaining a technique for detecting an abnormality in an EGR control valve.

DESCRIPTION OF PREFERRED EMBODIMENT

Figure 1:
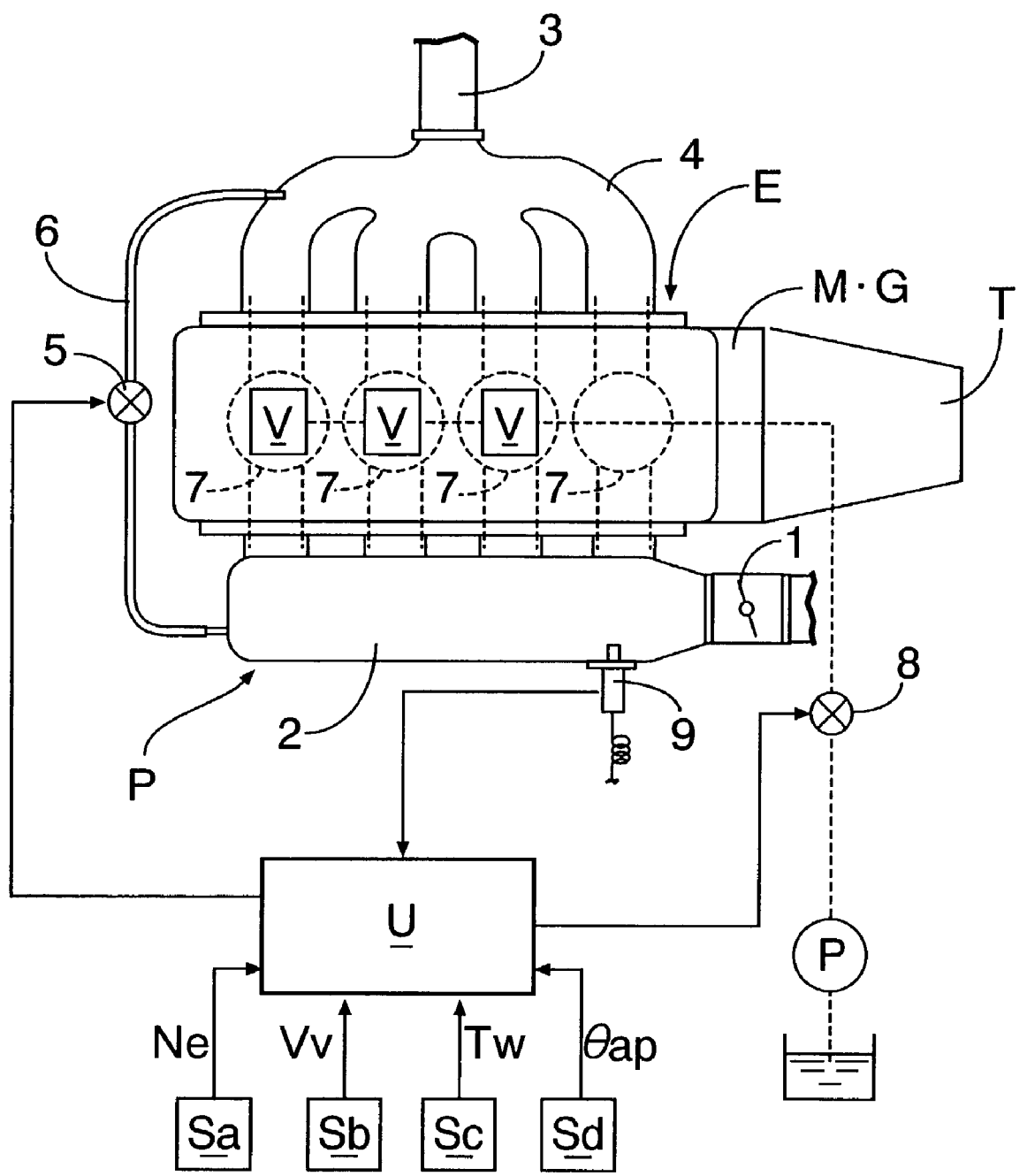
Figure 2:
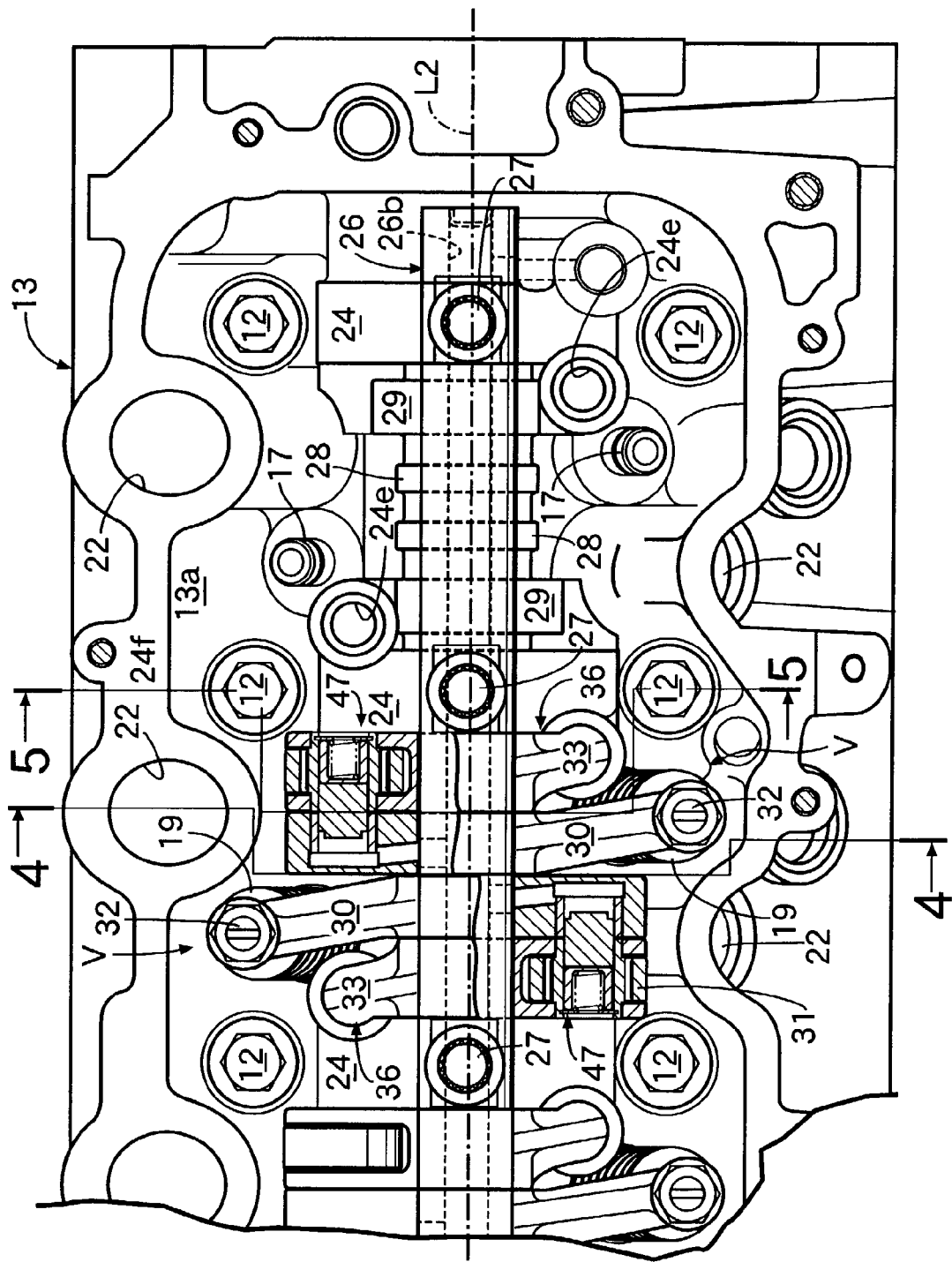

Referring to FIG. 1, a power unit P of a hybrid vehicle is formed by connecting in series an in-line four-cylinder engine E that can run in a cylinder cut-off state where three cylinders are cut off, a motor/generator M-G that functions as a motor and a generator, and a transmission T. The engine E includes, at its upstream end, an intake manifold 2 connected to a throttle valve 1 and, at its downstream end, an exhaust manifold 4 connected to an exhaust pipe 3. The exhaust manifold 4 and the intake manifold 2 are connected together via an EGR passage 6 equipped with an EGR valve 5. Three of four engine cylinders 7 include lift varying means V for running them in a cylinder cut-off state by making the intake valve lift and exhaust valve lift zero. These lift varying means V are connected to and operated by a hydraulic control valve 8.

An electronic control unit U is connected to an engine rotational speed sensor Sa for detecting an engine rotational speed Ne, a vehicle speed sensor Sb for detecting a vehicle speed Vv, a cooling water temperature sensor Sc for detecting a cooling water temperature Tw, and an accelerator opening degree sensor Sd for detecting a degree of accelerator opening θap. The electronic control unit U controls the operation of the hydraulic control valve 8 for the lift varying means V, and carries out detection of an abnormality in the EGR control valve 5 and a negative intake pressure sensor 9 provided in the intake manifold 2.

As shown in FIGS. 2 to 5, the engine E includes a cylinder head 13 joined by a plurality of bolts 12 to an upper surface of a cylinder block 11. Formed in the cylinder head 13 are a combustion chamber 14 and an intake port 15. Slidably supported in a valve guide 17 provided in the cylinder head 13 is a stem 16a of an intake valve 16 that opens and closes the downstream end of the intake port 15. A valve spring 20 is disposed between a spring seat 18 and a spring seat 19, the spring seat 18 being provided in an upper part of the valve guide 17 and the spring seat 19 being provided at a stem end of the intake valve 16. The valve spring 20 urges a bevel part 16b of the intake valve 16 in a direction in which it is seated on a valve seat 21. A spark plug 23 facing the combustion chamber 14 is mounted in the base part of a plug insertion tube 22 provided on the side opposite to the intake valve 16 relative to a cylinder axis L1.

The structure of an engine exhaust system of the present embodiment and the structure of the intake system described above are substantially symmetrical with respect to a cylinder line L2, and the intake system is explained below as being representative thereof. The reference numerals and symbols denoting each member of the exhaust system are the same as those denoting the corresponding members of the intake system.

A plurality of camshaft holders 24 are projectingly provided on the upper face of the cylinder head 13 so as to face upward, and one camshaft 25 is supported by these camshaft holders 24. The camshaft holder 24 has an integral structure without a cap and has a circular journal support hole 24a formed therein, a journal 25a formed in the camshaft 25 being rotatably fitted in the journal support hole 24a. One rocker arm shaft 26 is secured by a bolt 27 to the top of the camshaft holder 24. The camshaft 25 and the rocker arm shaft 26 are disposed parallel to each other on the cylinder axis L1.

The structure of the lift varying means V for variably controlling the lift of the intake valve 16 is now explained.

A cut-off intake cam 28 having no cam lobe and a drive intake cam 29 having a cam lobe are provided on the camshaft 25 so as to adjoin each other. The diameter of the cut-off intake cam 28 is the same as that of the base circle of the drive intake cam 29, and the maximum radius of the cam lobe of the drive intake cam 29 is smaller than the radius of the journal support hole 24a of the camshaft holder 24. This allows the camshaft 25 to be inserted into the journal support hole 24a of the camshaft holder 24 while preventing the cut-off intake cam 28 and the drive intake cam 29 from interfering with the journal support hole 24a of the camshaft holder 24.

A middle section of a drive rocker arm 30 is rockably supported on the rocker arm shaft 26, a slipper 34 provided at one end of the drive rocker arm 30 abuts against the cut-off intake cam 28, and an adjustment bolt 32 provided at the other end thereof abuts against the stem end of the intake valve 16. A middle section of a free rocker arm 33 is also rockably supported on the rocker arm shaft 26, a roller 31 provided at one end of the free rocker arm 33 abuts against the drive intake cam 29, and a receiving part 35 provided at the other end thereof is supported on a lost motion mechanism 36.

Fixed to one end of each of the drive rocker arm 30 and the free rocker arm 33 are guide tubes 37, 38, which are aligned coaxially and have an identical inner diameter. A connection pin 39 is slidably fitted in the guide tube 37 of the drive rocker arm 30, and a disconnection pin 40 having the same diameter as that of the connection pin 39 is slidably fitted in the guide tube 38 of the free rocker arm 33. The disconnection pin 40 is urged toward the connection pin 39 by means of a spring 42 disposed between the disconnection pin 40 and the spring seat 41. Formed in the rear face of the connection pin 39 is an oil chamber 43 for urging the connection pin 39 toward the disconnection pin 40 by means of hydraulic pressure. This oil chamber 43 communicates with an oil passage 26b formed in the interior of the rocker arm shaft 26 via an oil passage 30a formed in the interior of the drive rocker arm 30. The roller 31 is rotatably supported around the outer periphery of the guide tube 38 of the free rocker arm 33 via a needle bearing 44.

The connection pin 39, the disconnection pin 40, the spring 42, and the oil chamber 43 form a connection changeover mechanism 47 for the valve lift varying means V.

A notch 24d is formed on a side face of the camshaft holder 24 via a horizontal step 24c, and the free rocker arm 33 is fitted in the notch 24d. That is, a lower part of the camshaft holder 24 is thick, and an upper part connected thereto via the step 24c is thinner, and the free rocker arm 33 is disposed in the thinner notch 24d section on the side above the step 24c. The lost motion mechanism 36 includes a tubular support recess 24e formed integrally with the camshaft holder 24 and opening upward, a spring 45 fitted in the support recess 24e, and an abutment member 46 provided at the upper end of the spring 45 and abutting against the receiving part 35 of the free rocker arm 33.

Figure 3:
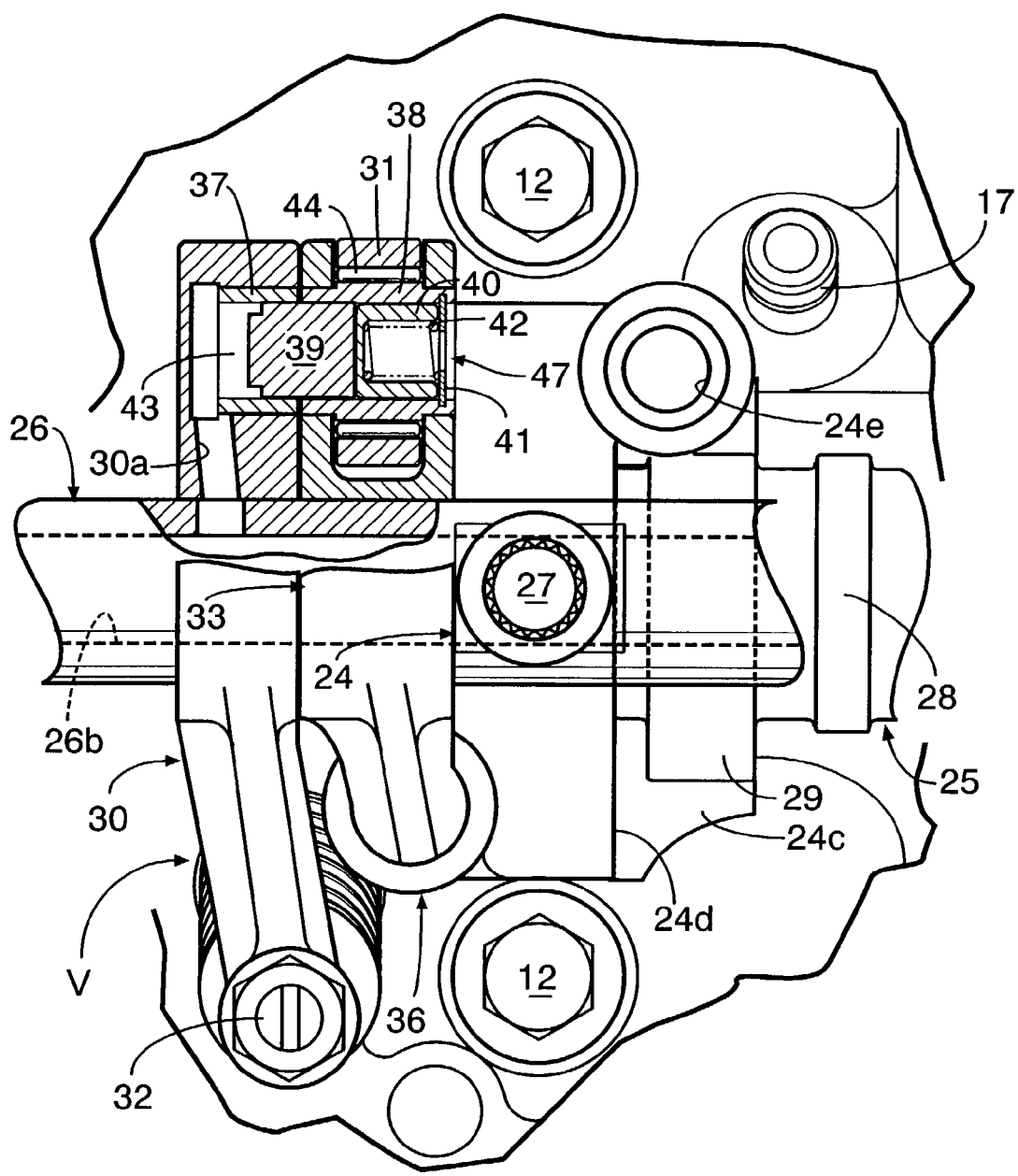
Figure 4:
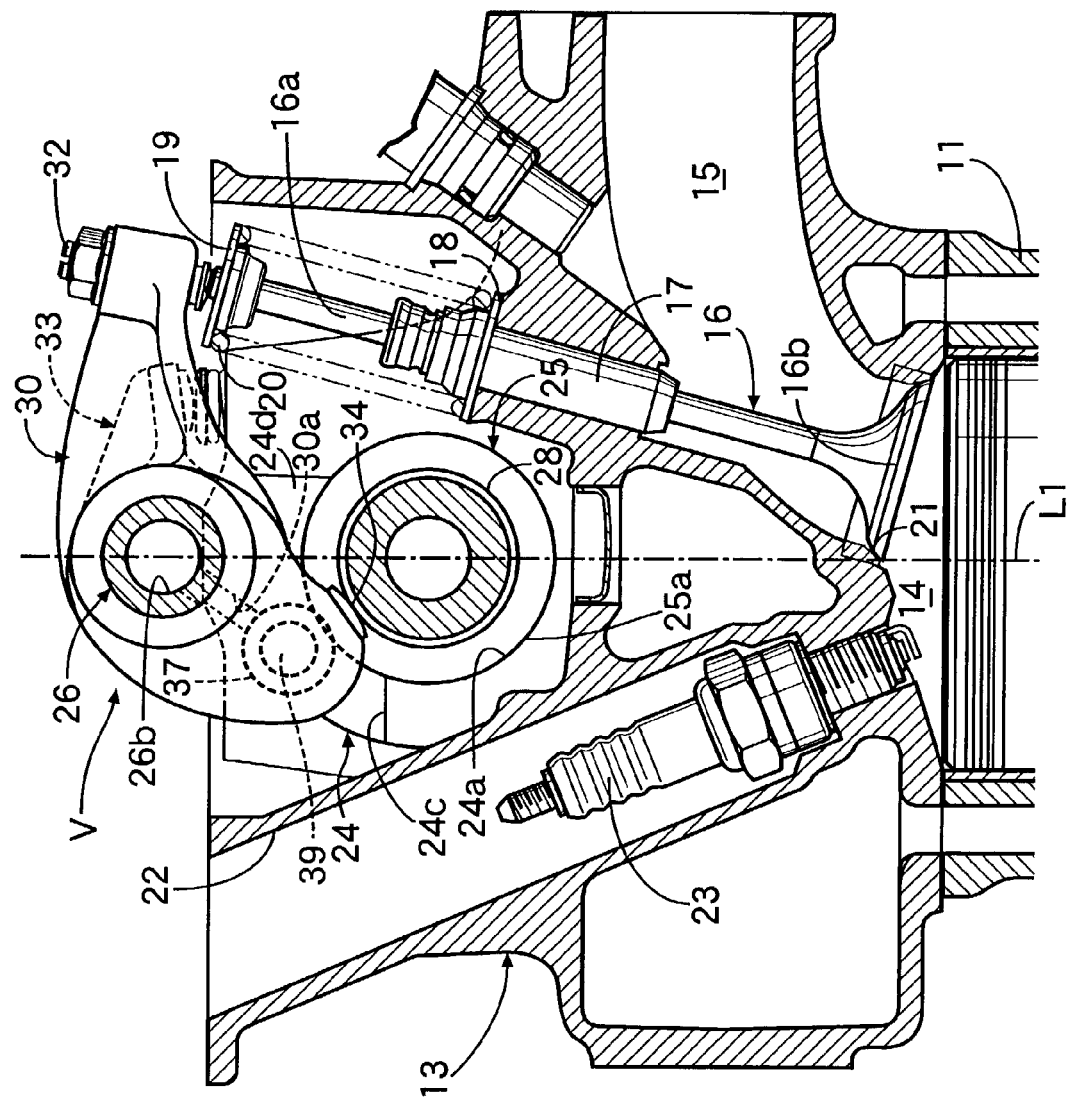
Figure 5:
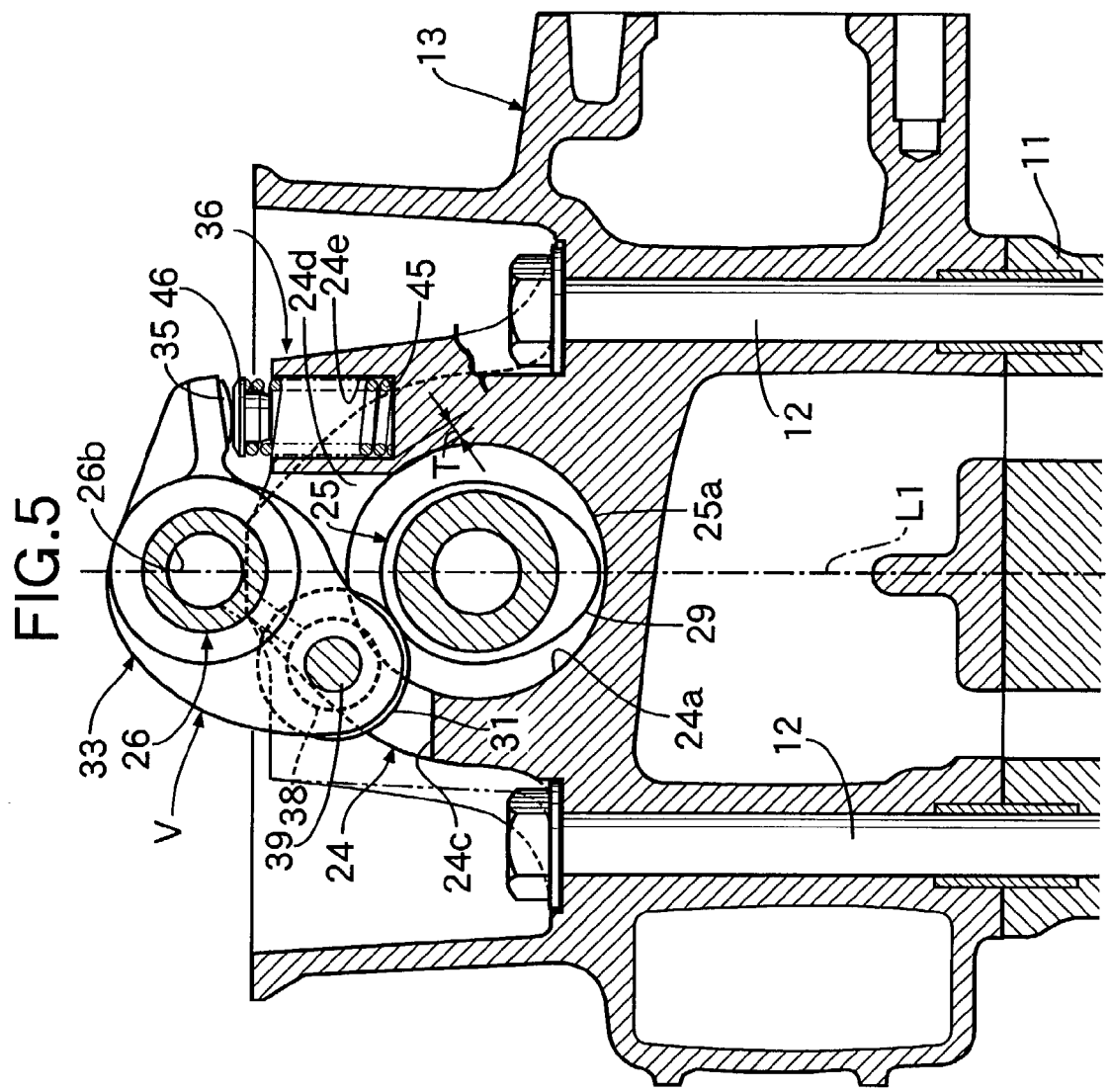

As shown in FIG. 3, when the vehicle is being accelerated or is cruising, a hydraulic pressure is supplied to the oil chamber 43 via the hydraulic control valve 8 (see FIG. 1), the oil passage 26b within the rocker arm shaft 26, and the oil passage 30a of the drive rocker arm 30 so as to push the connection pin 39 and the disconnection pin 40 against the spring 42. The drive rocker arm 30 and the free rocker arm 33 are thereby united via the connection pin 39. As a result, a rocking motion of the free rocker arm 33 having the roller 31 abutting against the drive intake cam 29 having a cam lobe is transmitted to the drive rocker arm 30 via the connection pin 39, and the drive rocker arm 30 opens and closes the intake valve 16. At this time, the cut-off intake cam 28 having no cam lobe only comes into contact with and becomes detached from the slipper 34 of the drive rocker arm 30 and is substantially non-functional.

On the other hand, when the vehicle is being decelerated and the hydraulic pressure exerted on the oil chamber 43 is released by the hydraulic control valve 8, the disconnection pin 40 pushes back the connection pin 39 by means of the resilient force of the spring 42, so that the abutting surfaces of the disconnection pin 40 and the connection pin 39 are positioned in the same plane as the boundary between the free rocker arm 33 and the drive rocker arm 30, thereby disconnecting the free rocker arm 33 from the drive rocker arm 30. As a result, the slipper 34 of the drive rocker arm 30 abuts against the cut-off intake cam 28 having no cam lobe, operation of the drive rocker arm 30 is thereby stopped, and the intake valve 16 remains closed. Three of the four cylinders of the engine E are thus in a cut-off state, thereby minimizing the pumping loss. At this time, the drive intake cam 29 having a cam lobe makes the free rocker arm 33 rock, but because the drive rocker arm 30 is disconnected from the free rocker arm 33, the rocking motion of the free rocker arm 33 is not transmitted to the drive rocker arm 30. Moreover, the abutment member 46 urged by the spring 45 of the lost motion mechanism 36 pushes the receiving part 35 of the free rocker arm 33 upward, thereby preventing the roller 31 from becoming detached from the drive intake cam 29.

Figure 6:
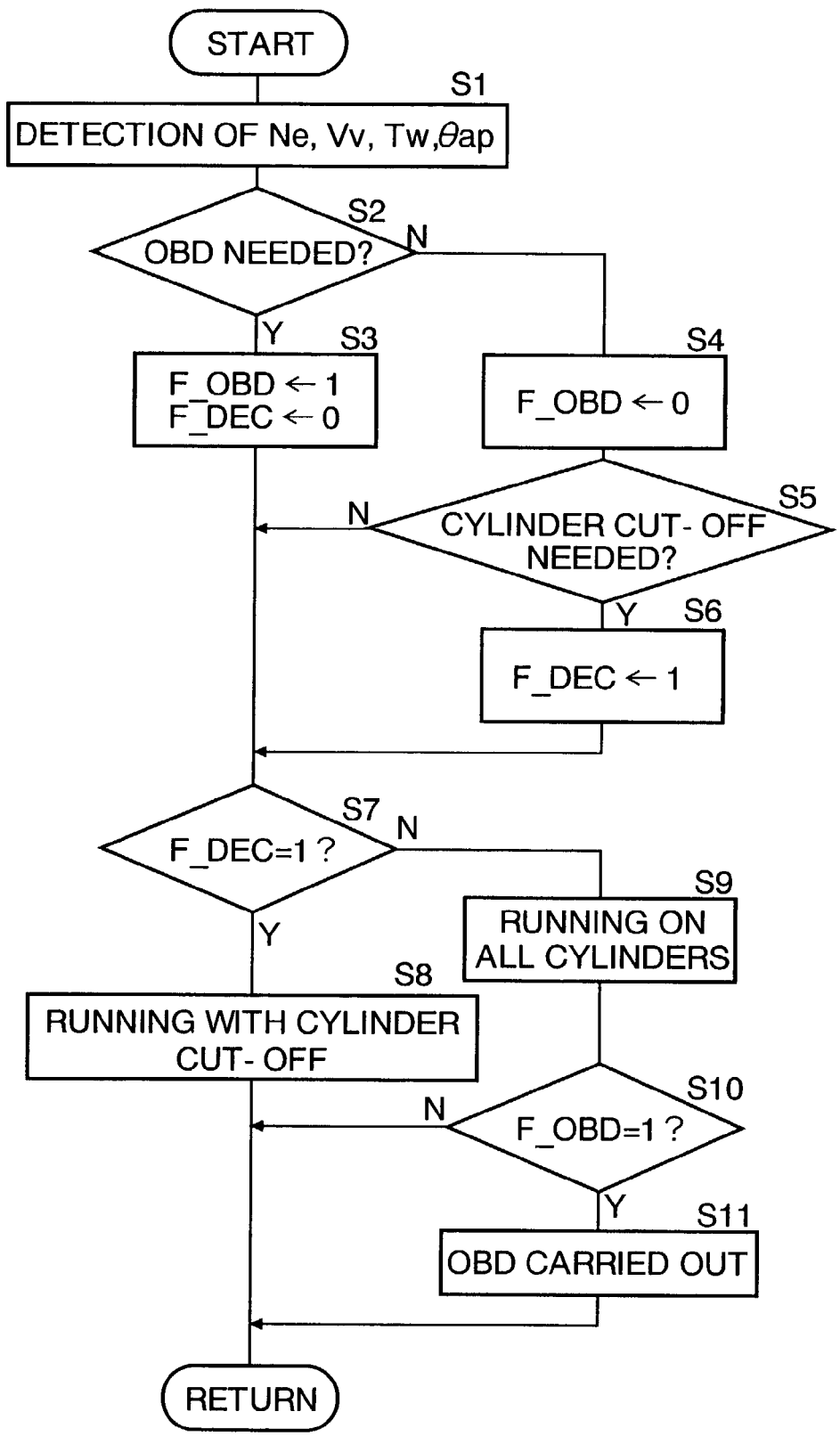

The operation of the embodiment of the present invention is now explained by reference to the flowchart shown in FIG. 6.

First, in step S1 the engine rotational speed sensor Sa, the vehicle speed sensor Sb, the cooling water temperature sensor Sc, and the accelerator opening degree sensor Sd detect the engine rotational speed Ne, the vehicle speed Vv, the cooling water temperature Tw, and the degree of accelerator opening θap respectively. In step S2 it is then determined whether or not there is a need for detection of an abnormality in the negative intake pressure sensor 8 and the EGR control valve 5. That is, it is determined that there is a need for detection of an abnormality if the engine rotational speed Ne is between a lower limit value Ne1 and an upper limit value Ne2 (Ne1<Ne<Ne2), the vehicle speed Vv exceeds a lower limit value Vv1 (Vv1<Vv), and the cooling water temperature Tw exceeds a lower limit value Tw1 (Tw1<Tw), and otherwise it is determined that there is no need.

If it is determined in step S2 above that there is a need for detection of an abnormality, in step S3 an abnormality detection flag F_OBD is then set at '1' (abnormality detection to be carried out), and a cylinder cut-off flag F_DEC is set at '0' (running on all cylinders). On the other hand, if it is determined in step S2 above that there is no need for detection of an abnormality, in step S4 the abnormality detection flag F_OBD is then set at '0' (abnormality detection not to be carried out), and in the following step S5 it is determined whether or not there is a need for cylinder cut-off. That is, if the vehicle speed Vv exceeds a lower limit Vv3 (Vv3 <Vv) and the degree of accelerator opening θap is fully closed (θap=0), that is, if the vehicle is being decelerated and it is necessary to reduce the pumping loss of the engine E in order for regenerative braking to be efficiently carried out by the motor/generator M-G, in step S6 the cylinder cut-off flag F_DEC is then set at '1' (running in a cylinder cut-off state).

In the following step S7, if the cylinder cut-off flag F_DEC is '1' (running in a cylinder cut-off state), in step S8 the engine E is then run in a cylinder cut-off state by making the lifts of the intake and exhaust valves 16 zero, thereby decreasing the pumping loss and enabling efficient regenerative braking to be carried out by the motor/generator M-G. On the other hand, if the cylinder cut-off flag F_DEC is '0' (running on all cylinders) in step S7 above, the engine E is then caused to run on all cylinders by driving the intake and exhaust valves 16 in step S9. If the abnormality detection flag F_OBD is '1' (abnormality detection to be carried out) in step S10, in step S11 detection of an abnormality in the negative intake pressure sensor 8 and the EGR control valve 5 is then carried out.

In this way, if there is a need for detection of an abnormality, the cylinder cut-off flag F_DEC is forcibly set to '0', thus prohibiting the engine E from running with cylinder cut-off (see steps S2, S3). Therefore, the abnormality detection can be carried out accurately while running the engine E on all cylinders. This is because when the engine E is run in a cylinder cut-off state, because the lifts of the intake and exhaust valves 16 become zero and the pumping action stops, a normal negative intake pressure cannot be generated in the intake manifold 2. On the other hand, when the engine E is run on all cylinders, the intake and exhaust valves 16 open and close and the engine E exhibits a pumping action, a normal negative intake pressure is generated in the intake manifold 2, and abnormality detection can thereby be carried out accurately.

A specific technique for detecting an abnormality in the negative intake pressure sensor 8 is now explained with reference to FIG. 7.

When there is a need for detection of an abnormality while the engine E is running in a cylinder cut-off state, the running in a cylinder cut-off state is forcibly changed over to a state of running on all cylinders, the engine E exhibits a pumping action, and a negative intake pressure is generated in the intake manifold 2. If the decrease in negative intake pressure Pb from atmospheric pressure detected by the negative intake pressure sensor 8 exceeds a threshold value at this point, the negative intake pressure sensor 8 reliably detects the negative intake pressure generated in the intake manifold 2, and it can be determined that its function is normal.

A specific technique for detecting an abnormality in the EGR control valve 5 is now explained with reference to FIG. 8.

When there is a need for detection of an abnormality while the engine E is running in a cylinder cut-off state, then the running in a cylinder cut-off state is forcibly changed over to a state of running on all cylinders, the engine E exhibits a pumping action, and a negative intake pressure is generated in the intake manifold 2. If the EGR control valve 5 is temporarily opened at this point, because the intake manifold 2 communicates with the exhaust manifold 4, which is at atmospheric pressure, via the EGR passage 6, the negative intake pressure Pb detected by the negative intake pressure sensor 8 should decrease by ΔPb. Therefore, if the decrease ΔPb of the negative intake pressure Pb exceeds a threshold value, it can be determined that the EGR control valve 5 is functioning normally.

Although the embodiment of the present invention is explained in detail above, the present invention can be modified in a variety of ways without departing from the spirit and scope of the present invention.

For example, in the engine E of the embodiment, only some of the cylinders are capable of being cut off, but it is also possible to make all the cylinders capable of being cut off.

Furthermore, the first aspect of the present invention is not limited to the detection of an abnormality in the negative intake pressure sensor 8 and the EGR control valve 5, but can be applied to the detection of any abnormality based on the negative intake pressure of the engine E.

Moreover, the lift varying means V of the embodiment applies a hydraulic pressure to the oil chamber 43 so as to provide a connection between the free rocker arm 33 and the drive rocker arm 30, thus producing a state in which all cylinders are running, and releases the hydraulic pressure from the oil chamber 43 so that the connection between the free rocker arm 33 and the drive rocker arm 30 is cut off by means of the resilient force of the spring 42, thus producing a state in which cylinders are running in a cut-off state, but the relationship can also be the reverse. In this way, when the hydraulic pressure does not work on the oil chamber due to a malfunction in the hydraulic system, the resilient force of the spring can provide a connection between the free rocker arm and the drive rocker arm, thus producing a state in which all cylinders are running, and the engine can continue to run without any problems.

What is claimed is:

1. A method for detecting an abnormality in a hybrid vehicle that comprises an engine that can run in a cylinder cut-off state where intake and exhaust valve lifts are made zero, and a motor/generator that functions as both a motor and a generator, the vehicle traveling by means of the power of at least one of the engine and the motor/generator and carrying out regenerative braking by the motor/generator while running the engine in a cylinder cut-off state during deceleration, the method comprising the steps of:

determining that detection of whether in a negative intake pressure sensor is in a state incapable of carrying out a normal function of sensing a negative intake pressure is desired when the engine is running in said cylinder cut-off state during deceleration;

prohibiting the engine from running in said cylinder cut-off state even during deceleration so as to allow a negative intake pressure to be generated in the engine;

then detecting a magnitude of the negative intake pressure by said negative intake pressure sensor in a state where the cylinder cut-off state is prohibited; and determining that an abnormality does not exist in said negative intake pressure sensor if said detected magnitude of the negative intake pressure exceeds a predetermined threshold.

2. The method for detecting an abnormality in a hybrid vehicle according to claim 1, wherein the engine comprises a plurality of cylinders and in said cylinder cut-off state, intake valve lifts of at least part of the cylinders are made zero.

3. A method for detecting an abnormality in a hybrid vehicle that comprises an engine that can run in a cylinder cut-off state where intake and exhaust valve lifts are made zero, and a motor/generator tat functions as both a motor and a generator, the vehicle traveling by means of the power of at least one of the engine and the motor/generator and carrying out regenerative braking by the motor/generator while running the engine in a cylinder cut-off state during deceleration, the method comprising the steps of:

determining that detection of whether in an EGR control valve for the engine is in a state capable of carrying out a normal valve function is desired when the engine is running in said cylinder cut-off state during deceleration;

prohibiting the engine from running in said cylinder cut-off state even during deceleration so as to allow a negative intake pressure to be generated in the engine; opening said EGR control valve;

then detecting a magnitude of an increase of the negative intake pressure by a negative intake pressure sensor in a state where the cylinder cut-off state is prohibited; and determining that an abnormality does not exist in said EGR control valve if said detected increase in the negative intake pressure exceeds a predetermined threshold.

4. The method for detecting an abnormality in a hybrid vehicle according to claim 3, wherein the engine comprises a plurality of cylinders and in said cylinder cur-off state, intake valve lifts of at least part of the cylinders are made zero.

* * * * *